United States Patent
Nezaki (10) Patent No.: US 8,246,077 B2
(45) Date of Patent: Aug. 21, 2012

(54) OCCUPANT RESTRAINING DEVICE FOR A VEHICLE

(75) Inventor: Takuya Nezaki, Mizunami (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/920,647

(22) PCT Filed: May 21, 2009

(86) PCT No.: PCT/JP2009/059324
§ 371 (c)(1),
(2), (4) Date: Sep. 2, 2010

(87) PCT Pub. No.: WO2010/055705
PCT Pub. Date: May 20, 2010

(65) Prior Publication Data
US 2011/0006508 A1    Jan. 13, 2011

(30) Foreign Application Priority Data
Nov. 11, 2008 (JP) .................................. 2008-288753

(51) Int. Cl.
*B60R 21/18* (2006.01)
*B60R 22/00* (2006.01)
(52) U.S. Cl. ...................... 280/733; 280/801.1; 280/808; 297/483
(58) Field of Classification Search .................. 280/733, 280/801.1, 808; 297/468, 483, 484
See application file for complete search history.

(56) References Cited

U.S. PATENT DOCUMENTS

| | | | | | |
|---|---|---|---|---|---|
| 4,817,754 | A | * | 4/1989 | Muramoto | 180/268 |
| 5,044,459 | A | * | 9/1991 | Nishikaji | 180/268 |
| 5,839,753 | A | | 11/1998 | Yaniv et al. | |
| 5,851,055 | A | | 12/1998 | Lewis | |
| 5,971,491 | A | * | 10/1999 | Fourrey et al. | 297/476 |
| 6,082,823 | A | * | 7/2000 | Aumont et al. | 297/452.2 |
| 6,089,662 | A | * | 7/2000 | Lambert et al. | 297/238 |
| 6,237,945 | B1 | * | 5/2001 | Aboud et al. | 280/733 |
| 6,382,666 | B1 | * | 5/2002 | Devonport | 280/733 |
| 6,705,641 | B2 | * | 3/2004 | Schneider et al. | 280/733 |
| 6,726,287 | B1 | * | 4/2004 | Janz | 297/483 |
| 2003/0168837 | A1 | | 9/2003 | Schneider et al. | |

FOREIGN PATENT DOCUMENTS
DE     102005047272 B3    4/2007
(Continued)

OTHER PUBLICATIONS
European Search Report dated Mar. 1, 2012 issued in European Patent Application 09825958.3.

*Primary Examiner* — Joseph Rocca
(74) *Attorney, Agent, or Firm* — Oblon, Spivak, McClelland, Maier & Neustadt, L.L.P.

(57) ABSTRACT

An occupant restraining device for a vehicle that can regulate a position of a seat belt, without occupying vehicle cabin space. An air belt device includes a retractor that is arranged to the rear, in a vehicle front-rear direction, with respect to a seat back, a seat belt that is pulled out from the retractor when applied to an occupant and that includes a shoulder belt portion for restraining an upper body of the occupant, and a belt insertion portion that is formed by indenting a portion, in a seat width direction, of an upper end of the seat back, and into which an upper side portion of the shoulder belt portion of the seat belt is made to enter.

11 Claims, 7 Drawing Sheets

FOREIGN PATENT DOCUMENTS

| | | |
|---|---|---|
| EP | 2221213 A2 | 8/2010 |
| FR | 2851974 A1 | 9/2004 |
| JP | 4 48066 | 4/1992 |
| JP | 2000 25546 | 1/2000 |
| JP | 2001 515429 | 9/2001 |
| JP | 2001 521462 | 11/2001 |
| JP | 2007 112415 | 5/2007 |
| JP | 2007 145328 | 6/2007 |

* cited by examiner

OCCUPANT RESTRAINING DEVICE FOR A VEHICLE

TECHNICAL FIELD

The present invention relates to an occupant restraining device for a vehicle for restraining at a seat an occupant that is seated at the seat, at least at the time of a collision.

BACKGROUND ART

A configuration is known in which an air belt passes through a shoulder portion of a seat back, wherein an air belt guide that is erected at a seat width direction outer side with respect to the expanded air belt is provided at the shoulder portion of the seat back. (For example, refer to Japanese Patent Application Laid-Open (JP-A) No. 2007-112415. Further, with respect to an air belt device, refer to the specification of United States Patent Application Publication No. 2003/0168837 and Japanese National Phase Publication No. 2001-521462.)

DISCLOSURE OF THE INVENTION

Problems to be Solved by the Invention

However, in conventional art such as described above, it is necessary to provide the belt guide which occupies vehicle cabin space from the shoulder portion of the seat back, and there is room for improvement with respect to this point.

It is an object of the present invention to obtain an occupant restraining device for a vehicle that can regulate a position of a seat belt, without occupying vehicle cabin space.

Means for Solving the Problems

An occupant restraining device for a vehicle according to a first aspect of the present invention comprises: a seat belt comprising an upper body restraining portion for restraining an upper body of an occupant, the seat belt being pulled out from a retractor when applied to the occupant; and a belt insertion portion that is formed by indenting a portion, in a seat width direction, of an upper end of a seat back, and into which an upper side portion of the upper body restraining portion of the seat belt is made to enter.

According to the above aspect, a portion of the seat belt that has been pulled out from the retractor is configured mainly as the upper body restraining portion and is applied to the occupant to restrain the upper body of the occupant with respect to a vehicle seat. In this application state, a portion of the seat belt that is directly above the upper body restraining portion is made to enter into the belt insertion portion of the seat back.

In this regard, in the present occupant restraining device for a vehicle, the belt insertion portion is formed by indenting a portion, in the seat width direction, of the upper end of the seat back. Further, movement, in the seat width direction, of the seat belt is restricted by recess walls positioned at both sides in the seat width direction, at the portion that is made to enter into the belt insertion portion. That is to say, the position of the seat belt is regulated by the belt insertion portion.

In this manner, in the occupant restraining device for a vehicle according to the first aspect of the present invention, the position of the seat belt can be regulated, without occupying vehicle cabin space.

In the above aspect, a configuration may be provided, wherein an expanding belt portion that is expanded and deployed by gas supply is provided at a portion of the seat belt that includes the portion that is made to enter into the belt insertion portion and the upper body restraining portion.

According to the above aspect, the occupant is protected due to the expanding belt portion of the seat belt being expanded and deployed, for example, at the time of a vehicle collision. In this regard, since the expanding belt portion is made to enter into the belt insertion portion at a portion in the longitudinal direction of the expanding belt portion, movement, in the seat width direction, of the expanding belt portion is restricted by the belt insertion portion even in an expanded and deployed state. That is to say, in the present occupant restraining device for a vehicle, the position of the expanded and deployed expanding belt portion is effectively regulated by the belt insertion portion.

An occupant restraining device for a vehicle according to a second aspect of the present invention comprises: a seat belt comprising an upper body restraining portion for restraining an upper body of an occupant, the seat belt being pulled out from a retractor when applied to the occupant; an expanding belt portion which is provided at a portion of the seat belt that includes the upper body restraining portion and a portion at an upper side of the upper body restraining portion, and which is expanded and deployed by gas supply; and a belt insertion portion which includes a recess formed by indenting a portion, in a seat width direction, of an upper end of a seat back, and in which a lower portion, in a vehicle up-down direction, of the expanding belt portion is made to enter into the recess when the expanding belt portion is deployed.

According to the above aspect, a portion of the seat belt that has been pulled out from the retractor is configured mainly as the upper body restraining portion and is applied to the occupant to restrain the upper body of the occupant with respect to a vehicle seat. In this application state, a portion of the seat belt that is directly above the upper body restraining portion is made to enter into the belt insertion portion of the seat back. The occupant is protected due to the expanding belt portion of the seat belt being expanded and deployed, for example, at the time of a vehicle collision.

In this regard, in the present occupant restraining device for a vehicle, at least when the expanding belt portion has been expanded and deployed, a state in which the lower portion, in the vehicle up-down direction, of the expanding belt portion has entered into the recess of the belt insertion portion is attained. As a result, movement, in the seat width direction, of the expanding belt portion is restricted by recess walls positioned at both sides in the seat width direction. That is to say, the position of the expanding belt portion which has been expanded and deployed is regulated by the belt insertion portion. Further, the recess of the belt insertion portion is formed by indenting the upper end portion of the seat back.

In this manner, in the occupant restraining device for a vehicle according to the second aspect of the present invention, the position of the seat belt can be regulated, without occupying vehicle cabin space. It should be noted that the recess of the belt insertion portion may have a configuration in which the expanding belt portion of the seat belt is always inserted therein (including before expansion and deployment), or may have a configuration in which the expanding belt portion is inserted therein accompanying the expanding belt portion being expanded and deployed.

In the above aspects, a configuration may be provided, wherein a left and right pair of the seat belt are provided, which are each provided with the expanding belt portion, and a left and right pair of the belt insertion portion are provided at the upper end of the seat back.

According to the above aspect, the upper body of the occupant is restrained by the upper body restraining portions of the left and right pair of the seat belts. When the expanding belt portions of the left and right pair of the seat belts are expanded and deployed, they intervene with each other so that repelling forces act in the seat width direction. In this regard, the left and right expanding belt portions are respectively supported by the recess walls at the seat width direction outer sides of the belt insertion portions into which the left and right expanding belt portions have been made to enter (the recess walls generate a supporting reaction force for the expanding belt portions), and therefore, the occupant is well protected by the left and right expanding belt portions.

In the above aspects, a configuration may be provided, wherein a planar surface maintenance structure for maintaining a planar surface shape of a contact surface contacting with a bottom surface of the belt insertion portion when the expanding belt portion is deployed is provided at the expanding belt portion.

According to the above aspect, the contact surface, of the expanding belt portions in the deployment process or deployment state, that contacts with the bottom surface of the belt insertion portion is maintained in a planar surface (flat) shape by the planar surface maintenance structure. As a result, movement, in the seat width direction, of the deployed expanding belt portions is even more effectively restricted.

Effects of the Invention

As described above, the occupant restraining device for a vehicle according to the present invention has the excellent effect of being able to regulate the position of the seat belt without occupying vehicle cabin space.

BEST MODE FOR IMPLEMENTING THE INVENTION

An air belt device 10 serving as an occupant restraining device for a vehicle according to a first exemplary embodiment of the present invention will be explained based on FIGS. 1-5. It should be noted that arrow FR, arrow UP and arrow W, which are appropriately noted in the respective drawings, respectively indicate a frontward direction (traveling direction), an upward direction and a vehicle width direction of a vehicle to which the air belt device 10 is applied. These respective directions substantially correspond to a frontward direction, an upward direction and a right side and left side in a seat width direction of a vehicle seat 11 to which the air belt device 10 is applied.

Figure 1:
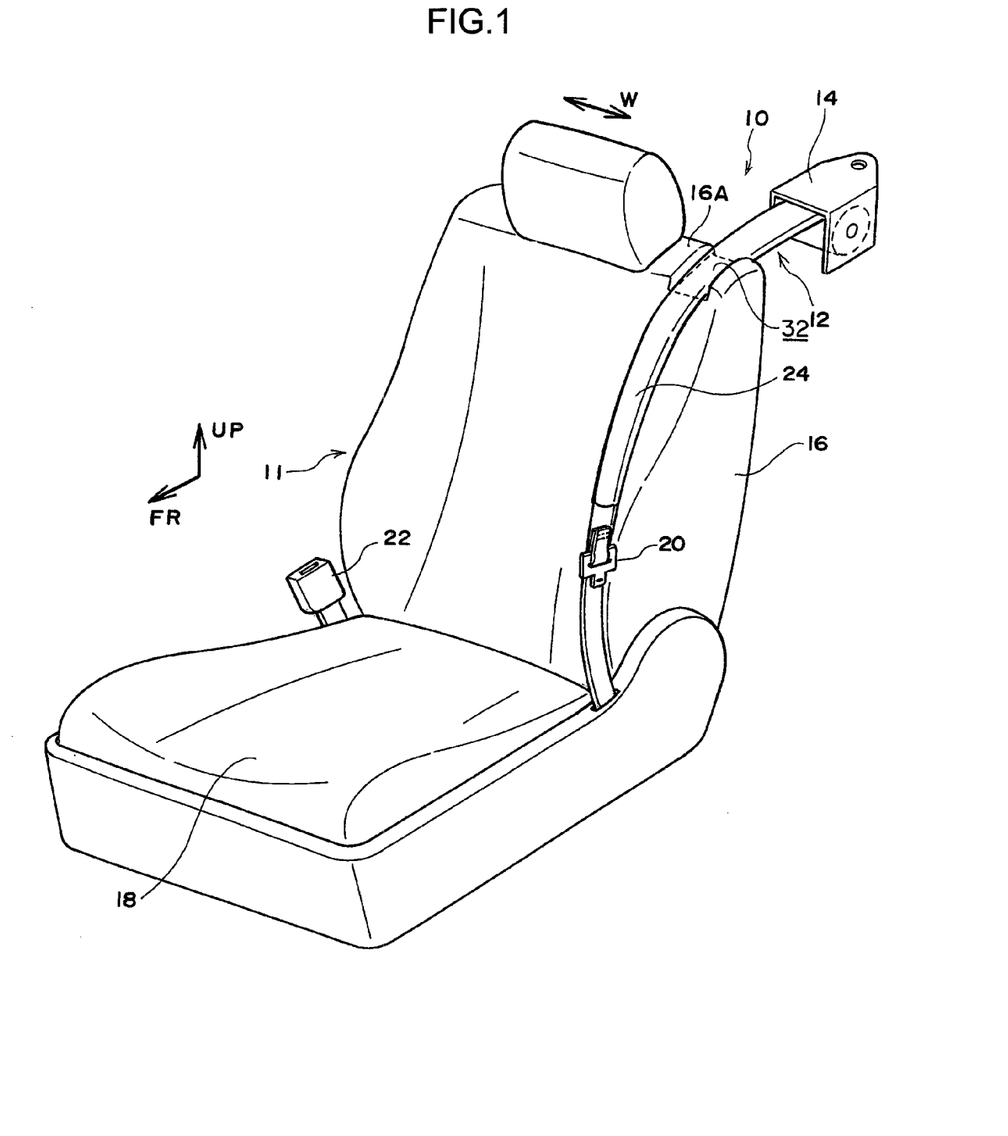
FIG. 1 is a perspective view showing a schematic overall configuration of an air belt device according to a first exemplary embodiment of the present invention.

In FIG. 1, a non-use state of the air belt device 10 that is applied to the vehicle seat 11 is shown in a perspective view. As shown in this drawing, the air belt device 10 comprises a retractor 14 that takes up one end side of a seat belt 12 so as to be able to be pulled out. The retractor 14 is disposed to the rear in a vehicle front-rear direction with respect to a seat back 16 configuring the vehicle seat 11 and fixed, for example, to a package tray rim or the like serving as a vehicle body. The other end side of the seat belt 12 is fixed by an unillustrated anchor to the side of a rear portion of a seat cushion 18 configuring the vehicle seat 11.

In this non-use state, the seat belt 12 extends in a vehicle up-down direction at one end side in the width direction of the vehicle seat 11, and a tongue plate 20 is provided at a substantially intermediate portion in the up-down direction thereof. The tongue plate 20 is configured so as to be capable of coupling and release of the coupling with respect to a buckle 22 disposed at an opposite side in the width direction of the vehicle seat 11.

Figure 2:
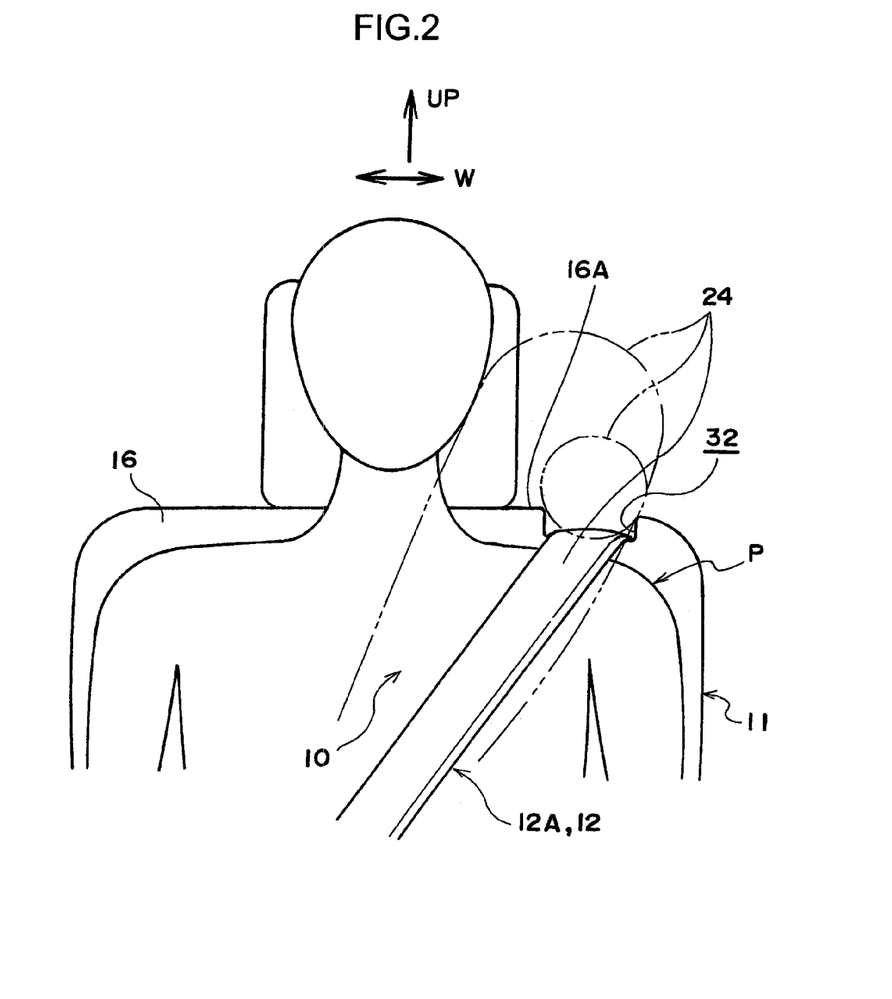
FIG. 2 is a front elevation view showing, in frame format, a main portion of the air belt device according to the first exemplary embodiment of the present invention.

In the air belt device 10, a configuration is provided in which, by coupling the tongue plate 20 with the buckle 22, a shoulder belt portion 12A serving as an upper body restraining portion extending from a shoulder portion of the seat back 16 to the tongue plate 20 spans diagonally across an upper body of an occupant. In this state, the seat belt 12 is configured so as to restrain the upper body of the seated occupant P at the shoulder belt portion 12A as shown in FIG. 2, and so that a lap belt portion (illustration of which is omitted from the drawings) extending from the tongue plate 20 to the anchor restrains a hip portion of the seated occupant P.

Accordingly, the air belt device 10 is configured as an air belt device having a three-point-type seat belt device as a base thereof. Further, in the air belt device 10, the retractor 14 is disposed to the rear of the seat back 16 as described above. As a result, the seat belt 12, which is put in an application state by the seated occupant P at the vehicle seat 11, is provided with a configuration in which a portion directly above the shoulder belt portion 12A is wound across a shoulder portion 16A (a belt insertion portion 32 which will be described later) of the seat back 16. In the present exemplary embodiment, a configuration is provided in which a shoulder anchor or the like that guides the seat belt 12 is not provided between the retractor 14 and the shoulder portion 16A of the seat back 16.

Further, at least one portion of the seat belt 12, which portion includes the shoulder belt portion 12A, is configured as an air belt 24 serving as an expanding belt portion that receives gas supply from an unillustrated inflator to be expanded and deployed. In the application state of the seat belt 12 by the seated applicant P at the vehicle seat 11, the air belt 24 is established as at least a portion that is wound across the shoulder portion 16A of the seat back 16 and a portion that spans substantially the entire length of the shoulder belt portion 12A.

Figure 3A:
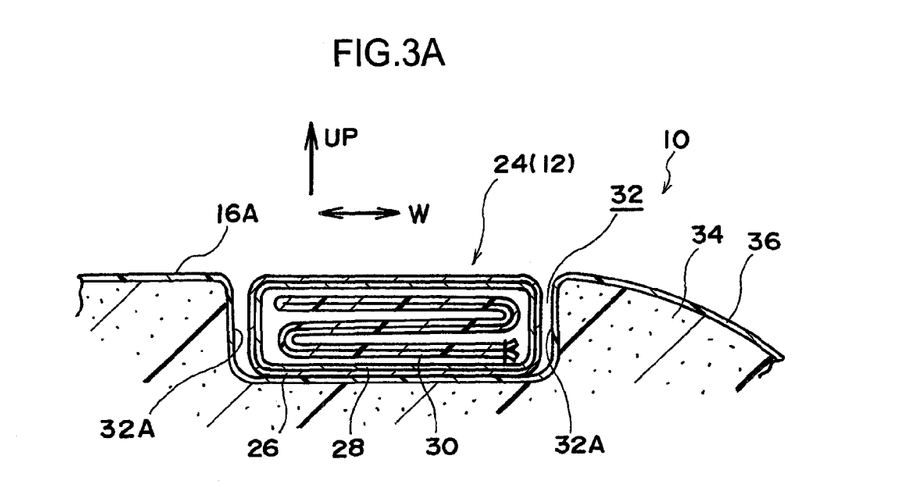
FIG. 3A is a front cross-sectional view at a time of non-expansion, showing, in enlargement, an insertion state of an air belt configuring the air belt device according to the first exemplary embodiment of the present invention into a belt insertion portion.

To supplement with regard to the air belt 24, as shown in FIG. 3A, the air belt 24 comprises as main portions thereof a cover 26 serving as a belt main body, an elastic mesh webbing 28 that is provided at an inner side of the cover 26, and an air bag 30 that is provided in a folded state at an inner side of the mesh webbing 28.

Figure 3B:
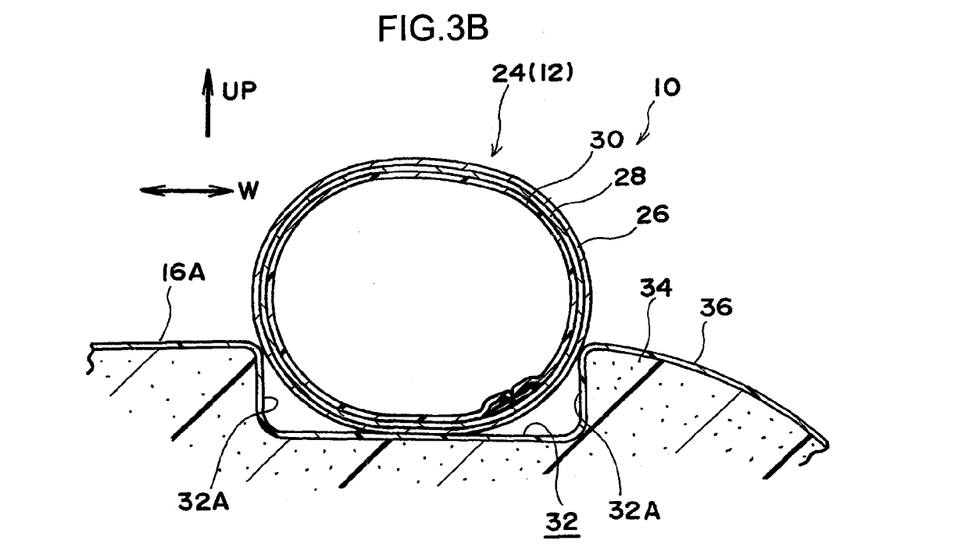
FIG. 3B is a front cross-sectional view at a time of expansion, showing, in enlargement, an insertion state of the air belt configuring the air belt device according to the first exemplary embodiment of the present invention into the belt insertion portion.
Figure 4:
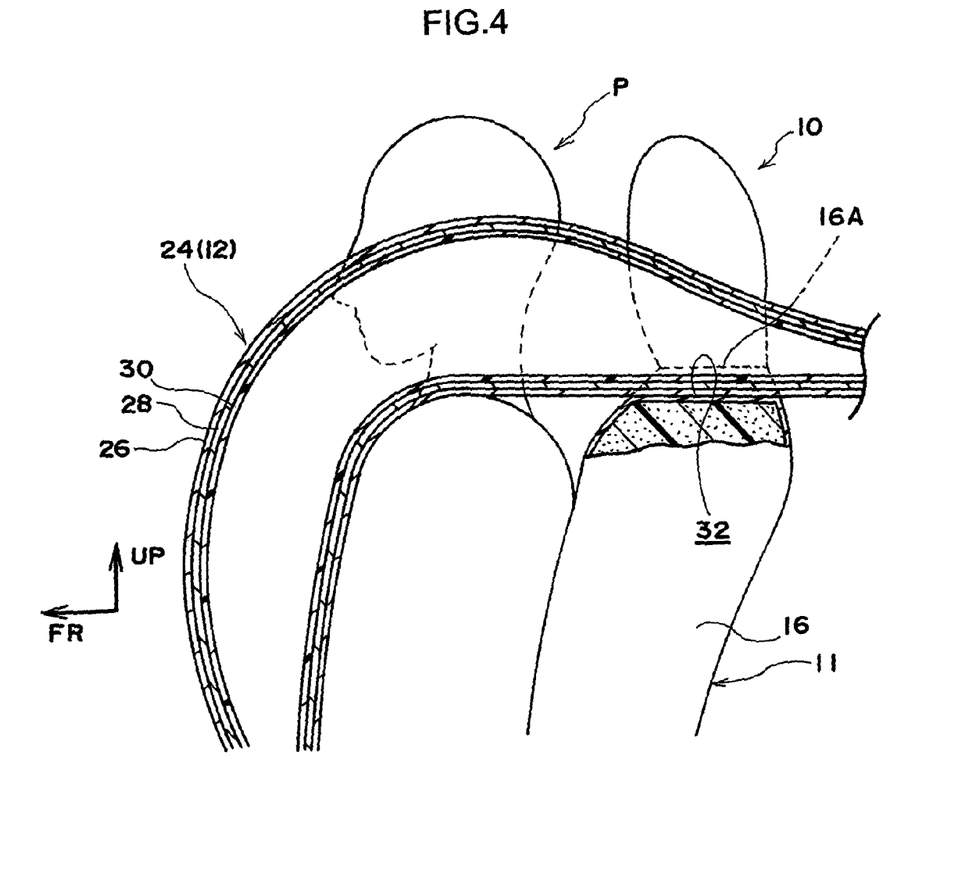
FIG. 4 is a side cross-sectional view showing an expansion state of the air belt in the air belt device according to the first exemplary embodiment of the present invention.

The air belt 24 is configured so that, due to receiving gas supply from the unillustrated inflator arranged at the retractor 14 side or the anchor side and the air bag 30 being expanded, the entire air belt 24 is expanded and deployed as shown by the imaginary lines in FIG. 2 and in FIG. 3B and FIG. 4. A portion of the seat belt 12 other than the air belt 24 is joined with the cover 26 by stitching or the like. The inflator is configured such that, for example, in a case where (the inevitability of) a frontal collision of the vehicle is detected or predicted, the inflator is activated by an unillustrated ECU and supplies gas to the air bag 30.

Further, the air belt device 10 comprises a belt insertion portion 32 for regulating a position of the seat belt 12 (air belt 24). The belt insertion portion 32 is formed as a recess by indenting a portion, in the seat width direction, of the shoulder portion 16A of the seat back 16 across the entire length thereof in the vehicle front-rear direction, so as to open upward in the vehicle up-down direction. A setting region of the air belt 24 of the seat belt 12 is slidably inserted into the belt insertion portion 32. The air belt 24 is configured so as to be made to enter into the belt insertion portion 32 so as to be slidable in the longitudinal direction thereof, at least in the application state of the seat belt 12 by the seated occupant P at the vehicle seat 11.

Accordingly, the belt insertion portion 32 has a width that is equal to or greater than a width of the air belt 24. Further, the width and the depth of the belt insertion portion 32 is determined such that a portion (cross section) of the air belt 24 that is expanded directly above the shoulder portion 16A of the seat back 16 is inserted into the belt insertion portion 32 by only about ⅓ of the up-down direction dimension thereof. In the present exemplary embodiment, the retractor 14 is disposed at the same position or lower in the vehicle up-down direction with respect to the shoulder portion 16A (bottom of the belt insertion portion 32) of the seat back 16. As a result, in the air belt device 10, a configuration is provided in which the air belt 24 can be inserted into the belt insertion portion 32 (wound across the bottom of the belt insertion portion 32) without using a shoulder anchor or the like that guides the seat belt 12 (air belt 24) as described above.

As shown in FIG. 3 and FIG. 4, the belt insertion portion 32 is formed integrally with the seat back 16 by indenting a portion of a cushion material (pad) 34 configuring the seat back 16 and providing an epidermal material 36 at the indentation.

Next, operation of the first exemplary embodiment will be explained.

In the air belt device 10 of the above configuration, when the seat belt 12 is applied, the seated occupant P at the vehicle seat 11 couples the tongue plate 20 with the buckle 22 while pulling out the seat belt 12 from the retractor 14. As a result, as shown in frame format in FIG. 2, the shoulder belt portion 12A restrains the upper body of the seated occupant P, and the unillustrated lap belt portion restrains the hip portion of the seated occupant P.

When a frontal collision of the vehicle is detected or predicted, the ECU activates the inflator. When this happens, gas is supplied from the inflator to the air bag 30 of the air belt 24, and the air belt 24 is expanded and deployed in a predetermined shape. As a result, the occupant is protected with respect to the frontal collision.

In this regard, in the present air belt device 10, the air belt 24 is entered into the belt insertion portion 32 formed at the seat back 16. As a result, in the expansion and deployment state (process) of the air belt 24, movement of the air belt 24 in the seat width direction is restricted by a pair of recess walls 32A of the belt insertion portion 32 that face each other in the seat width direction. That is to say, the position of the expanded and deployed air belt 24 with respect to the vehicle seat 11 (occupant) is regulated. In particular, movement of the air belt 24 toward the seat width direction outer sides is restricted by the recess walls 32A at the seat width direction outer sides.

As a result, in the air belt device 10, the air belt 24 is expanded and deployed at a position suited to protection of the occupant, and the occupant is effectively protected. Further, since the belt insertion portion 32 is configured by indenting the shoulder portion 16A of the seat back 16, the position of the air belt 24 can be regulated, without occupying vehicle cabin space.

Due to the foregoing, in the air belt device 10, there is no need to provide a guide member that occupies vehicle cabin space for positional regulation of the air belt 24. Accordingly, reduction in the number of parts and reduction in cost is achieved. Further, parts that protrude into the vehicle cabin space are reduced, and improvement in effective utilization and availability of limited vehicle cabin space, improvement in appearance and the like are achieved.

Figure 5:
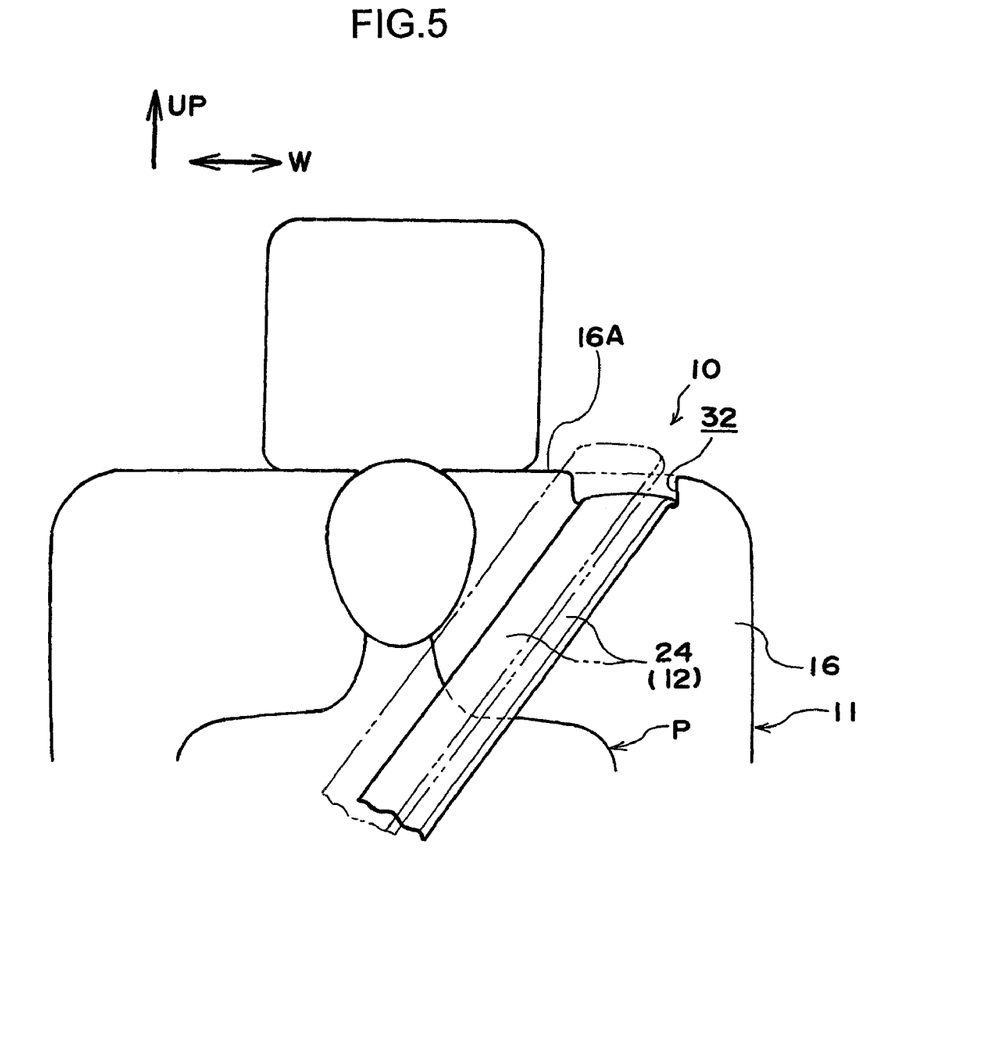
FIG. 5 is a front elevation view showing, in frame format, a restraining state of a small occupant by the air belt device according to the first exemplary embodiment of the present invention.

Further, in the air belt device 10, a configuration is provided in which the air belt 24 (seat belt 12) is made to enter into the belt insertion portion 32. As a result, as shown in FIG. 5, the seat belt 12 (particularly the shoulder belt portion 12A) can be properly applied with respect to an occupant whose sitting height is low, such as a child or the like. For example, in a comparative example in which the belt insertion portion 32 is not provided, the shoulder belt portion 12A is easily interfered with by a neck portion for the seated occupant P whose relative sitting height is low, as shown by imaginary lines in FIG. 5.

In contrast, in the air belt device 10, the portion across which the seat belt 12 is wound is a lower position with respect to the comparative example. As a result of this, the shoulder belt portion 12A is disposed at a position at which it is less likely to interfere with the neck portion for an occupant whose relative sitting height is low, as shown by solid lines in FIG. 5. Moreover, movement of the seat belt 12 toward the side of the neck portion of the seated occupant P is restricted by the recess wall 32A at the seat width direction inner side of the belt insertion portion 32. As a result, in the air belt device 10, as discussed above, a contribution is made to properly applying the shoulder belt portion 12A to the seated occupant P having a small build whose sitting height is low, such as a child or the like.

(Other Exemplary Embodiments)

Next, other exemplary embodiments of the present invention will be explained. It should be noted that, for parts and portions that are basically the same as in the above-described first exemplary embodiment or previously presented configurations, the same reference numerals as in the above-described first exemplary embodiment or previously presented configurations may be allotted thereto, and explanation and illustration thereof may be omitted in some cases.

(Second Exemplary Embodiment)

Figure 6:
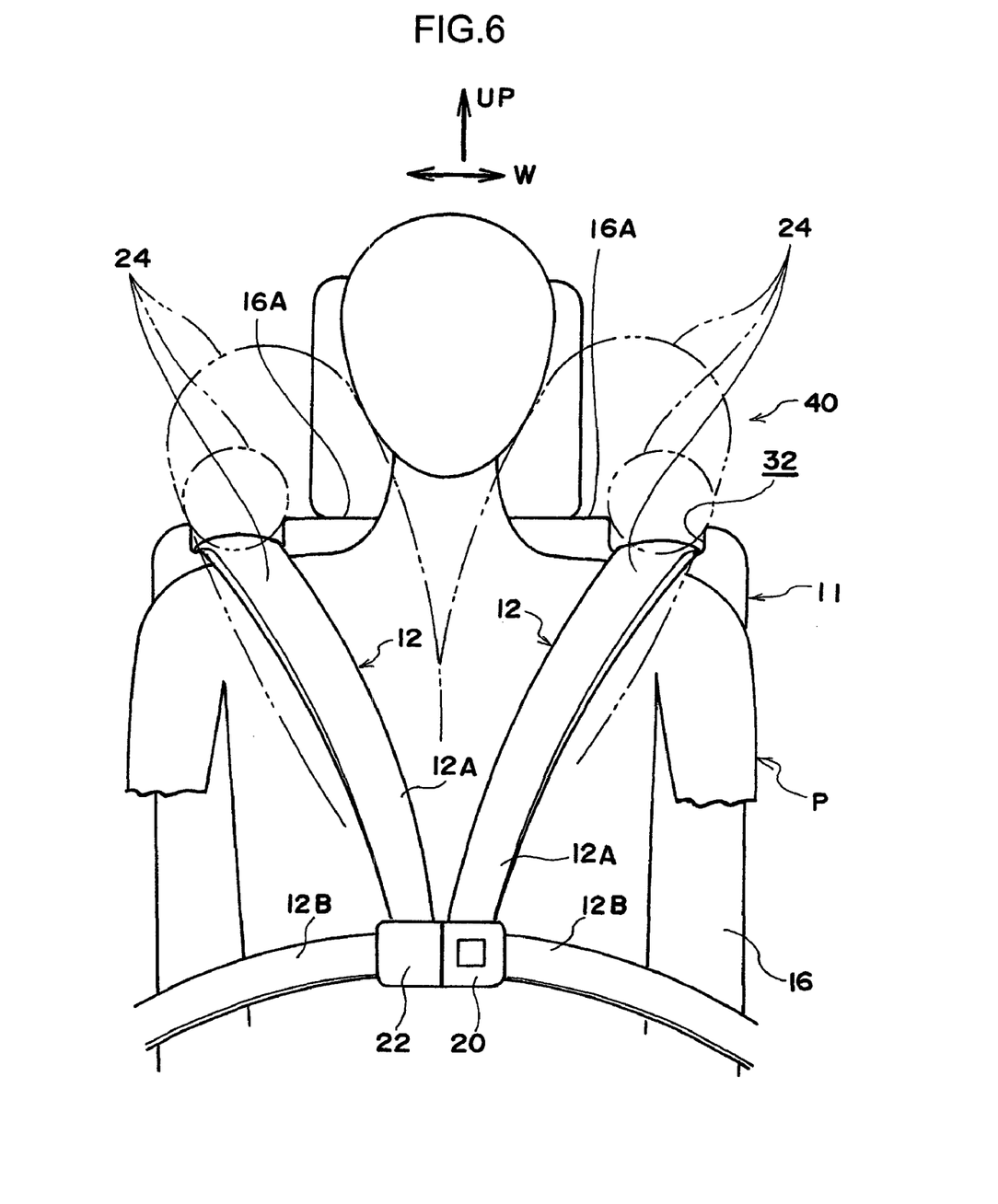
FIG. 6 is a front elevation view showing, in frame format, a main portion of an air belt device according to a second exemplary embodiment of the present invention.

In FIG. 6, an air belt device 40 serving as an occupant restraining device for a vehicle according to a second exemplary embodiment of the present invention is shown in a frame format front elevation view. As shown in this drawing, the air belt device 40 differs from the air belt device 10, which is a three-point-type air belt device, in that it comprises a left and right pair of seat belts 12 and is configured as a so-called four-point-type air belt device.

Specifically, in the left and right seat belts 12, upper end sides thereof are respectively taken up by retractors 14, which are not illustrated in the drawings, and lower end sides thereof are respectively fixed at rear portions of a seat cushion 18 via anchors. Further, a tongue plate 20 is provided at a substantially intermediate portion of one of the seat belts 12, and a buckle 22 is provided at a substantially intermediate portion of the other of the seat belts 12. As a result, in the air belt device 40, a configuration is provided such that, in a usage state in which the tongue plate 20 has been coupled with the buckle 22, a left and right pair of shoulder belt portions 12A restrain the upper body of the seated occupant P at the vehicle seat 11, as shown in FIG. 6. Further, in the air belt device 40 in this usage state, a configuration is provided such that lap belt portions 12B configured by the left and right seat belts 12 restrain the hip portion of the seated occupant P.

Further, in the air belt device 40, belt insertion portions 32 are respectively formed at left and right shoulder portions 16A of the seat back 16. Accordingly, portions of air belts 24 in the left and right seat belts 12 are respectively inserted into the corresponding belt insertion portions 32. Other configurations in the air belt device 40 are the same as corresponding configurations of the air belt device 10, including portions that are not illustrated in the drawings.

Accordingly, it is possible to obtain basically similar effects by similar operation as in the air belt device 10 according to the first exemplary embodiment, also by the air belt device 40 according to the second exemplary embodiment. In particular, in the four-point-type air belt device 40, there are cases where the expanded and deployed left and right air belts 24 intervene so that repelling forces act against each other to the seat width direction outer sides as shown by imaginary lines in FIG. 6. Even in this case, in the air belt device 40, the left and right belt insertion portions 32 regulate the positions of the respective air belts 24 at proper positions. That is to say, recess walls 32A at the seat width direction outer sides of the respective belt insertion portions 32 support the reaction forces of the air belts 24, and the positions of the respective air belts 24 are regulated at proper positions. As a result, in the air belt device 40, the occupant protection effect by the left and right air belts 24 is high.

(Third Exemplary Embodiment)

Figure 7:
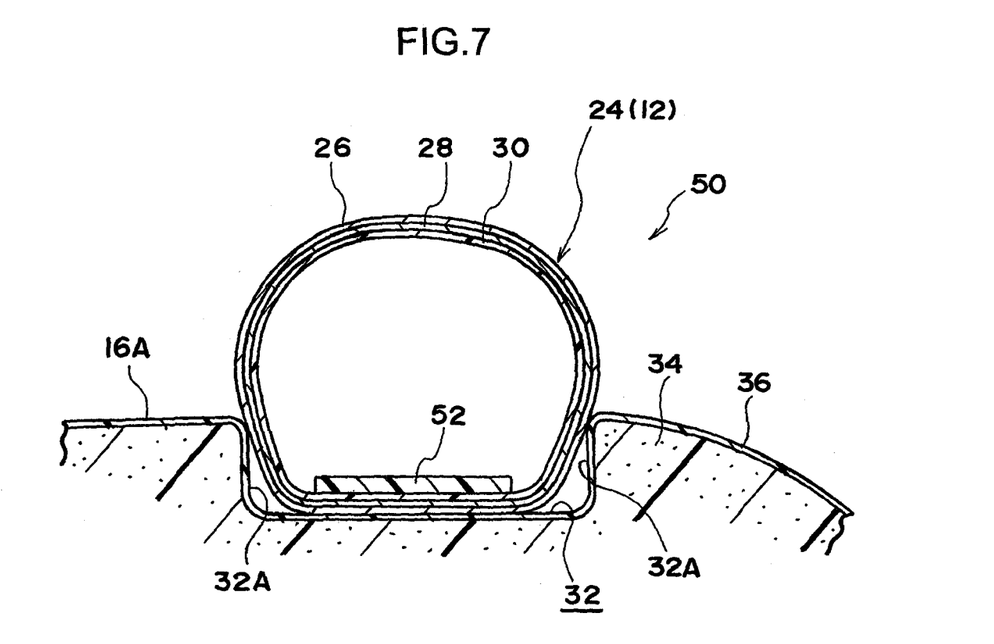
FIG. 7 is a front cross-sectional view showing, in frame format, a main portion of a four-point-type air belt device according to a third exemplary embodiment of the present invention.

In FIG. 7, the main portion of an air belt device 50 serving as an occupant restraining device for a vehicle according to a third exemplary embodiment of the present invention is shown in a front cross-sectional view corresponding FIG. 3B. As shown in this drawing, the air belt device 50, differs from the air belt device 10 according to the first exemplary embodiment in that a thick belt 52 serving as a deformation regulation portion is provided within the air belt 24.

The thick belt 52 is formed to be thick using, for example, a material (fiber) that is the same as that of the air bag 30 and is made to be integral with the air bag 30 by stitching or the like. It should be noted that the thick belt 52 may be made to be integral with the cover 26 or the mesh webbing 28, rather than with the air bag 30. The thick belt 52 is established in a predetermined range of the air belt 24 where it is inserted into the belt insertion portion 32 at least in the application state of the seat belt 12 by the occupant, and at a lower side in the vehicle up-down direction (bottom side of the belt insertion portion 32).

In the air belt device 50, a configuration is provided such that a deployment shape of the air belt 24 is regulated by the thick belt 52 to a shape in which a lower end portion is substantially flat as shown in FIG. 7. Other configurations of the air belt device 50 are the same as corresponding configurations of the air belt device 10 or the air belt device 40, including portions that are not illustrated in the drawings.

Accordingly, it is possible to obtain basically similar effects by similar operation as in the air belt device 10 or 40 according to the first or second exemplary embodiment, also by the air belt device 50 according to the third exemplary embodiment. In particular, in the air belt device 50, since the lower end of the air belt 24 in the deployment process or deployment state is substantially flat, the air belt 24 (seat belt 12) is less likely to roll with respect to force in the seat width direction. As a result, in the air belt device 50, positional variation of the air belt 24 in the seat width direction with respect to the belt insertion portion 32 is even less likely to occur, and the air belt 24 is expanded and deployed at a position suited to protection of the occupant and contributes to effective protection of the occupant with greater certainty.

It should be noted that, in the respective exemplary embodiments described above, although examples in which the seat belt 12 comprises the air belt 24 have been shown, the present invention is not limited thereto. The present invention may be applied, for example, to a three-point-type or four-point-type seat belt device in which the seat belt 12 does not comprise the air belt 24. In this case, as shown in FIG. 5, by providing the belt insertion portion 32, a contribution is made to properly applying the seat belt 12 (particularly the shoulder belt portion 12A) with respect to a small-build occupant.

Further, in the exemplary embodiments described above, although examples in which the belt insertion portion 32 always causes the air belt 24 to be inserted therein have been shown, the present invention is not limited thereto. For example, in a configuration in which the seat belt 12 comprises the air belt 24, a configuration may be provided wherein a belt insertion portion into which the air belt 24 is inserted accompanying expansion and deployment of the air belt 24 is provided at the shoulder portion 16A of the seat back 16. For example, in a configuration in which the epidermal material 36 ordinarily covers an opening end (upper end) of the recess formed in the cushion material 34, a configuration may be provided wherein a tear portion of the epidermal material 36 is torn by deployment pressure of the air belt 24, or a configuration may be provided wherein, by forming the epidermal material 36 at a position covering the recess with a material having high elasticity, the air belt 24 is inserted into the belt insertion portion accompanying expansion and deployment.

Furthermore, in the exemplary embodiments described above, although examples in which the retractor 14 is disposed to the rear in the vehicle front-rear direction with respect to the seat back 16 have been shown, the present invention is not limited thereto. As long as the present invention has a configuration in which a portion in the longitudinal direction of the seat belt 12 or the air belt 24 is disposed along (wound across) at least a portion in the vehicle front-rear direction of the shoulder portion 16A of the seat back 16, it is possible to apply the present invention. Accordingly, the present invention can be applied, for example, to a configuration wherein the retractor 14 is disposed within the seat back 16, and the seat belt 12 or air belt 24 is led out from the shoulder portion 16A and disposed along the shoulder portion 16A. In this case, the belt insertion portion 32 may be provided toward the vehicle front with respect to a belt lead-out portion of the shoulder portion 16A.

The invention claimed is:

1. An occupant restraining device for a vehicle, comprising:
   a left seat belt and a right seat belt, each seat belt including an upper body restraining portion for restraining an upper body of an occupant;
   a left retractor and a right retractor, from which the left and right seat belts are pulled out, respectively, when the seat belts are applied to the occupant; and
   a seat including a seat back having left and right shoulders disposed in a seat width direction, the left and right shoulders including a left belt insertion portion and a right belt insertion portion, respectively, the left and right belt insertion portions each including a recessed indentation across the respective left and right shoulders, the indentations extending from a first side of the seat back to a second side of the seat back, and the upper body restraining portions of the respective left and right seat belts being disposed in the respective left and right belt insertion portions,
   wherein the left and right seat belts further include, respectively, a left expanding belt portion and a right expanding belt portion, the left and right expanding belt portions encompassing a portion of the respective left and right seat belts that is disposed in the left and right belt insertion portions and the respective upper body restraining portions, and the left and right expanding belt portions being expanded and deployed by a gas supply, and wherein said recessed indentions include responsive recess walls directly from the respective shoulders to a bottom of the respective recessed indentations.

2. The occupant restraining device for a vehicle of claim 1, wherein a planar surface maintenance structure, which maintains a planar surface shape of a contact surface contacting with a bottom surface of the respective left and right belt insertion portions when the expanding belt portions are deployed, is provided at each of the expanding belt portions.

3. The occupant restraining device for a vehicle of claim 1, wherein the retractors are disposed rearward in a vehicle front-rear direction with respect to the seat back.

4. The occupant restraining device for a vehicle of claim 2, wherein the retractors are disposed rearward in a vehicle front-rear direction with respect to the seat back.

5. The occupant restraining device for a vehicle of claim 1, wherein the recessed indentations are open to an outer perimeter of the right and left shoulders of the seat back, respectively.

6. The occupant restraining device for a vehicle of claim 1, further comprising a planar belt insert disposed inside each of the left and right expanding belt portions, respectively.

7. The occupant restraining device for a vehicle of claim 1, wherein each recessed indentation includes two opposing recess walls that are adjoined by a base wall.

8. The occupant restraining device for a vehicle of claim 1, wherein a depth of the respective indentations in a direction into the seat back is such that about ⅓ of the respective expanding belt portions is inserted in the respective left and right belt insertion portions when the expanding belt portions are expanded.

9. An apparatus, comprising:
   a seat belt including
      an upper body restraining portion, and
      an expanding belt portion that is expanded and deployed by a gas supply;
   a retractor from which the seat belt is pulled out; and
   a seat including a shoulder having a recessed channel that extends across a surface of the shoulder, the channel extending from a first side of the seat back to a second side of the seat back,
   wherein the channel accommodates the upper body restraining portion of the seat belt being inserted therein, and wherein the channel includes recessed walls directly extending from the shoulder to a bottom of the channel.

10. The apparatus according to claim 9, wherein the channel is delimited by two opposing recess walls that are adjoined by a base wall.

11. The apparatus according to claim 9, wherein a depth of the channel in a direction into the seat back is such that about ⅓ of the expanding belt portion is inserted in the channel when the expanding belt portion is expanded.

* * * * *